(12) United States Patent
Bhan et al.

(10) Patent No.: US 7,894,361 B1
(45) Date of Patent: Feb. 22, 2011

(54) SYSTEM AND METHOD FOR NETWORK CAPACITY ENGINEERING

(75) Inventors: Ashish Bhan, Shawnee, KS (US); Anoop Goyal, Overland Park, KS (US); Manish Padte, Overland Park, KS (US); Hemanth Balaji Pawar, Overland Park, KS (US); Michael E. Shafer, Jr., Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 415 days.

(21) Appl. No.: 11/951,329

(22) Filed: Dec. 5, 2007

(51) Int. Cl.
*G01R 31/08* (2006.01)
(52) U.S. Cl. ...................... 370/252; 370/465
(58) Field of Classification Search .......... 370/230, 370/230.1, 235, 242, 243, 244, 245, 252, 370/465
See application file for complete search history.

(56) References Cited

U.S. PATENT DOCUMENTS

| | | | |
|---|---|---|---|
| 5,809,282 A * | 9/1998 | Cooper et al. .......... 709/226 |
| 5,970,064 A * | 10/1999 | Clark et al. ........... 370/351 |
| 6,389,015 B1 * | 5/2002 | Huang et al. .......... 370/376 |
| 7,274,670 B2 * | 9/2007 | Hicks et al. .......... 370/252 |
| 7,363,285 B2 * | 4/2008 | Kalyanaraman et al. ...... 707/2 |
| 2005/0132051 A1 * | 6/2005 | Hill et al. ........... 709/226 |
| 2005/0254426 A1 * | 11/2005 | Simonis ............. 370/235 |
| 2007/0118643 A1 * | 5/2007 | Mishra et al. ........ 709/224 |

\* cited by examiner

*Primary Examiner*—Ricky Ngo
*Assistant Examiner*—Christine Ng

(57) ABSTRACT

A system for managing network capacities is disclosed. The system comprises a processor implementing a data collection module configured to collect a plurality of capacity utilization data. The processor also implements a capacity analysis module configured to produce an actual capacity utilization map using the plurality of capacity utilization data. The capacity analysis module is also configured to produce a projected capacity utilization map using a plurality of designed node and link capacities, and a plurality of capacity engineering constraints. The processor also implements a simulation module configured to simulate a network management action and to produce simulated capacity utilization maps. The processor also implements a network management action module configured to suggest network management actions based on the actual capacity utilization map and the projected capacity utilization map and to rank the one or more network management actions based on the one or more simulated capacity utilization maps.

20 Claims, 4 Drawing Sheets

SYSTEM AND METHOD FOR NETWORK CAPACITY ENGINEERING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A network operator may operate multiple networks, including fixed networks and wireless networks. A network may include a large number of network nodes and network links. Examples of the network nodes may include a switch in a public switched telephone network (PSTN), a router in an IP network, a mobile switching center (MSC) in a wireless network, a base station in a wireless access network, and an application server in any of the mentioned networks, among many others. Examples of the network links may include copper wire, fiber lines and air interface for the wireless network. A network node may have a design capacity. For example, the capacity of a switch in the PSTN network may be a maximum number of calls the switch may carry during a fixed period of time. The capacity of a router in an IP network may be a throughput of packets. A link may have a design capacity. For example, a T-carrier 1 (T1) of copper wire may have a transmission capacity of about 1.55 mbps, and an optical carrier 3 (OC3) may have a transmission capacity of about 155 mbps.

Network nodes and links may be expensive investments for a network operator. It may happen from time to time that some of the nodes and links are over utilized and other nodes and links are underutilized. This may happen because network traffic patterns may change over time, and a current network configuration may change over time as well. The network traffic pattern changes may include a shift of traffic from one part of the network to another part of the network, and an addition of new traffic to some part of the network, for reasons such as an offering of new wireless service. The network configuration change may include addition of new nodes or links and decommissioning of existing nodes or links, among others. In addition to large investment in the network nodes and network links, a specialized group of engineering staff may be dedicated to operating, monitoring and maintaining a network node or part of the network.

SUMMARY

In one embodiment, a system for managing network capacities is provided that comprises a processor implementing a data collection module and a capacity analysis module. The data collection module is configured to collect a plurality of capacity utilization data. The capacity analysis module is configured to produce an actual capacity utilization map using the plurality of capacity utilization data. The capacity analysis module is also configured to produce a projected capacity utilization map using a plurality of designed node capacities, a plurality of designed link capacities, and a plurality of capacity engineering constraints. The processor also implements a simulation module and a network management action module. The simulation module is configured to simulate a network management action and to produce one or more simulated capacity utilization maps. The network management action module is configured to suggest one or more network management actions based on the actual capacity utilization map and the projected capacity utilization map. The network management action module is also configured to rank the one or more network management actions based on the one or more simulated capacity utilization maps.

In a second embodiment, a method for managing network resources is provided that comprises collecting a plurality of capacity utilization data from a plurality of network nodes, producing and displaying one or more actual capacity utilization maps using the plurality of capacity utilization data. The method also comprises producing and displaying one or more projected capacity utilization maps using one or more link design capacities, one or more node design capacities, and one or more network capacity engineering constraints. The method also includes suggesting one or more network management actions based on the one or more actual capacity utilization maps and one or more projected capacity utilization maps, simulating the one or more network management actions to produce one or more simulated capacity utilization maps, and ranking the one or more network management actions.

In a third embodiment, a system is provided that comprises a plurality of network nodes configured with one or more capacity reporting modules (CRMs). The system also includes a network capacity management system that is configured to receive a plurality of capacity utilization data from the one or more CRMs and to produce one or more actual capacity utilization maps using the plurality of capacity utilization data. The network capacity management system is also configured to produce one or more projected capacity utilization maps using one or more design network capacities and one or more capacity engineering constraints. The network capacity management system is also configured to suggest one or more network management actions based on the one or more actual capacity utilization maps and the one or more projected capacity utilization maps. The network capacity management system is also configured to evaluate a network management action by simulating the network management action and by producing one or more simulated capacity utilization maps. The network capacity management system is further configured to take one or more network management actions based on the simulated capacity utilization maps.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The method and system of the present disclosure may provide one or more network-wide views of traffic load and capacity utilizations. The method and system may promote trending the capacity utilization data, simulating a network management action to evaluate the effect of the action before the action is actually taken, and suggesting and ranking one or more network management actions based on the results of the trending and the simulation. The method and system of the present disclosure may promote a self-healing network management by allowing a management system to take a network management action proactively based on the simulation results or in response to a network event such as detecting an over utilized network node or network link. In some embodiments, the system may take the network management action without human intervention.

Figure 1:
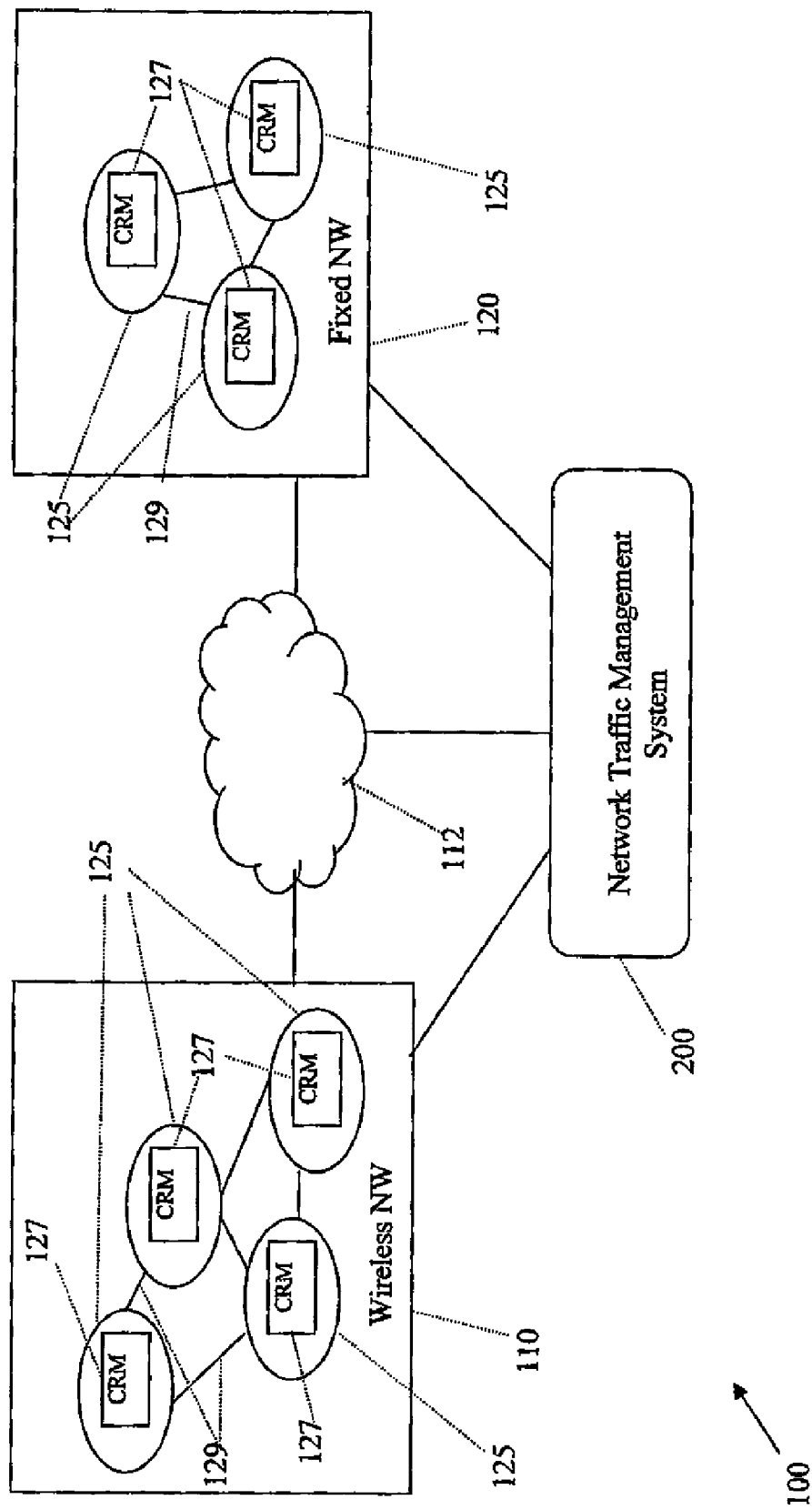
FIG. 1 illustrates multiple networks and a network traffic management system according to embodiments of the present disclosure.

FIG. 1 illustrates an embodiment of multiple networks 100. The networks 100 comprise a wireless network 110, a fixed network 120, an interconnecting network 112, and a network traffic management system 200. The wireless network 110 and fixed network 120 may belong to one carrier and may be managed by the network capacity network management system 200. In other embodiments, the wireless network 110, the fixed network 120, and the network capacity network management system 200 may belong to different carriers.

The wireless network 110 may include a set of network nodes 125, which may in turn include a capacity reporting module (CRM) 127, and a set of network links 129. The examples of the network nodes 125 may include mobile switching center (MSC), wireless media gateways (WMGs), and base stations. The network nodes may be interconnected by the network links 129. Examples of the network links 129 may include transmission links T-carriers such as T1, and T3, and optical carriers such as OC1 and OC3 with varying capacities. T1, for example, may have about a 1.5 megabit per second (mbps) transmission capacity, and OC3 may have about a 155.5 mbps transmission capacity.

The fixed network 120 may also include network nodes 125, which in turn may include one or more CRM 127, and network links 129. The examples of the fixed network nodes may include routers, switches, and transmission nodes, among others. The network nodes 125, similar to the wireless network nodes, are interconnected by the network links 129. Examples of the network links may include the transmission link T1, T3, OC1, OC3, and OC12, among others. The fixed network nodes may form a hierarchy or may have a flat organization, depending on the network technology in use. A PSTN network, for example, may have a hierarchical organization including a local access network at the bottom of the hierarchy, and a number of tandem switching nodes interconnecting local access network nodes. An IP network, on the other hand, may have a flat organization, with routers interconnecting with each other at one level.

Network nodes 125 of the wireless network 110 and the fixed network 120 may both have capacity reporting modules (CRM) 127. Each of the CRMs 127 may report to the network traffic management system 200 the node capacity utilization data and link capacity utilization data. The interconnecting network 112 may interconnect more than one managed networks, but may not be managed itself by the same network management system such as the network traffic management system 200.

The network traffic management system 200 is a network management system that may be centrally located and may connect to or be in communication with the managed wireless network 110 and the fixed network 120 via direct lines or the interconnecting network 112. The network traffic management system 200 may monitor the managed networks 110 and 120, collect capacity utilization data from the network nodes 125 by communicating with the CRMs 127 on the network nodes 125, analyze and trend the capacity utilization data, suggest network management actions based on the analysis, and simulate a network management action on the network 110 or 120 before the network management action is taken.

Figure 2:
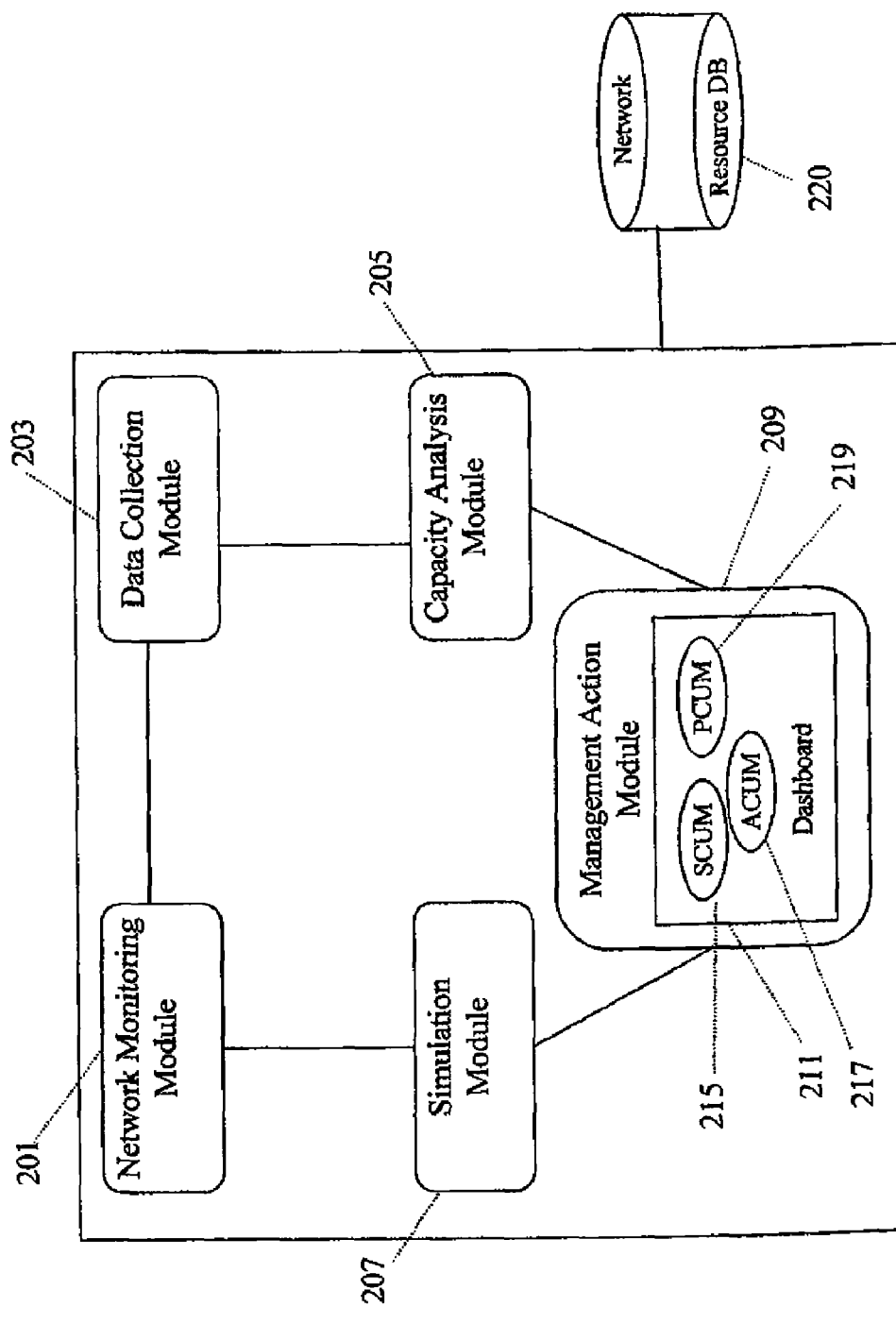
FIG. 2 illustrates an embodiment of a network traffic management system.

FIG. 2 illustrates an embodiment of the network traffic management system 200. The network traffic management system 200 may include a network monitoring module 201, a data collection module 203, a capacity analysis module 205, a simulation module 207, a network management action module 209, and a network resource database 220.

The network monitoring module 201 may be configured to monitor of the network nodes 125 and the network links 129 of the managed wireless network 110 and the managed fixed network 120. The network monitoring module 201 may monitor network events such as alarms, network resource usages, traffic reporting, among others, without taking an action. The monitoring may be done in a real time manner, a non-real-time manner, or a combination of the two. Real time monitoring refers to the monitoring that is performed in a time frame that typically has negligible perceivable delay. Non-real-time monitoring may be done offline or at a scheduled time, for example in batches.

The data collection module 203, coupled with the network monitoring module 201, may collect, filter, organize, and store into the network resource database 220 the network capacity utilization data. The data collection may take place at the same time as the network monitoring module 201 and may be done in a real-time manner or a non-real-time manner. The data collection module 203 may communicate with one of the CRMs 127 to collect the capacity utilization data of one of the network nodes 125 and one of the network links 129. The data collection module 203 may obtain traffic load data first in order to get the capacity utilization. The capacity utilization may be obtained as a ratio of a measured traffic load to the design capacity of the network node 125 or the network link 129. The capacity utilization for a switch in the fixed network 120, for example, is the ratio of the measured busy hour call attempts (BHCA) to the design capacity of BHCA. The data collection module 203 may get a traffic load data directly from a CRM 127 in some cases, and in some other cases, may calculate the measured traffic load. In case of a traffic load for a switch in the fixed network 120, the data collection module 203 may need to accumulate the call numbers for a specified period of time in order to obtain the BHCA, if the BHCA data is not directly available from the switch node.

The capacity analysis module 205 may be configured to compute an actual capacity utilization map. The actual capacity utilization map may provide a network-wide view of capacity utilization. The utilization map may include a set of the network nodes 125, a set of measured capacity utilization data associated with the network nodes 125, a set of the network links 129, and a set of measured capacity utilization associated with the network links 129. The actual capacity utilization map may be represented as a graph, a table or other forms, depending on the design choice. The capacity analysis module 205 may generate the actual utilization map using the node capacity utilization data and link capacity utilization data collected by the data collection module 203. The capacity analysis module 205 may also produce a projected capacity utilization map. The actual utilization map may represent the current state of capacity utilization of the wireless network 110 and the fixed network 120. A projected capacity utilization map may represent a theoretically optimal state of capacity utilization of the wireless network 110 and the fixed network 120. From a network-wide view, the nodes 125 or the links 129 may not achieve their design capacities, because of various network capacity engineering constraints. For example, an OC3 link might utilize only a small portion of its design capacity if it is coupled with a T1 link. In this case, the incoming traffic first comes through the T1, and then to the OC3, and the OC3 link capacity is constrained by the T1 design capacity, not the design capacity of the OC3 link itself. Another type of capacity engineering constraint is based on cost consideration. A network operator may have leased links and owned links, and the cost of leased links may be usage based. In this case, one constraint might be that the leased links are used only when the capacities of the owned links have been exhausted. The capacity analysis module 205 may take into consideration the network capacity engineering constraints, and the design capacities of the network nodes 125 and the network links 129 in generating the projected capacity utilization map.

The simulation module 207 may be configured to simulate one or more network management actions. The simulation module 207 may first use a simulator to simulate the wireless network 110 and the fixed network 120. The simulated network nodes and network links may have design capacities and actual capacity utilizations. The simulation module 207 may then take one or more network management actions in the simulated network, collect simulated capacity utilization data on the simulated network, and produce a simulated capacity utilization map. The simulated capacity utilization map may represent a network-wide view of capacity utilizations in the simulated network after the network management actions are taken.

The network management action module 209 may suggest one or more network management actions based on the actual capacity utilization map and the projected capacity utilization map. The network management action module 209 may compare the actual capacity utilization map with the projected capacity utilization map to identify potential areas for network management actions. For example, the comparison may reveal that some network nodes 125 and network links 129 may be over utilized, and some other nodes 125 and links 129 may be underutilized. Some nodes 125 or links 129 may be a bottleneck for the overall traffic flows. Then one or more network management actions may be suggested based on the comparison. For example, some network trunks may be reallocated among one or more nodes. The network management action module 209 may collaborate with the network simulation module 207 to evaluate the overall impact and effectiveness of one or more network management actions by producing one or more simulated capacity utilization maps. Based on the simulated capacity utilization maps, the network management action module 209 may rank alternative network management actions to help an operator make a decision on which network management action to take.

The network management action module 209 may have a dashboard 211 to present to the operator the actual capacity utilization map, the projected capacity utilization map, one or more simulated capacity utilization maps, and the set of alternative network actions ranked in an order of preference. The dashboard 211 may provide the operator with a one-glance view of the actual capacity utilization map (ACUM) 217, the projected capacity utilization map (PCUM) 219, and the simulated capacity utilization map (SCUM) 215. The network management action module 209 may have a user interface (UI) to allow the operator to take management actions such as adding a link 129, decommissioning a link 129, and moving a network node 125. The dashboard 211 may present information to the operator by displaying the information or by printing the information to the operator or by some other presentation mechanism.

The network resource database 220 may be configured to store network node records and network link records. A record or an entry for the network node 125, for example, may include a node ID field, a node design capacity field, a node actual capacity utilization field, a node location field, a neighboring nodes field, and a capacity engineering constraint field, among others. A record or an entry for the network link 129 may include a link ID field, a link design capacity field, a link actual capacity utilization field, a link location field, a connecting nodes field, and a capacity engineering constraint field, among others. The network resource database 220 may be implemented using an object-oriented database, a relational database, or other current or future database technologies.

Figure 3:
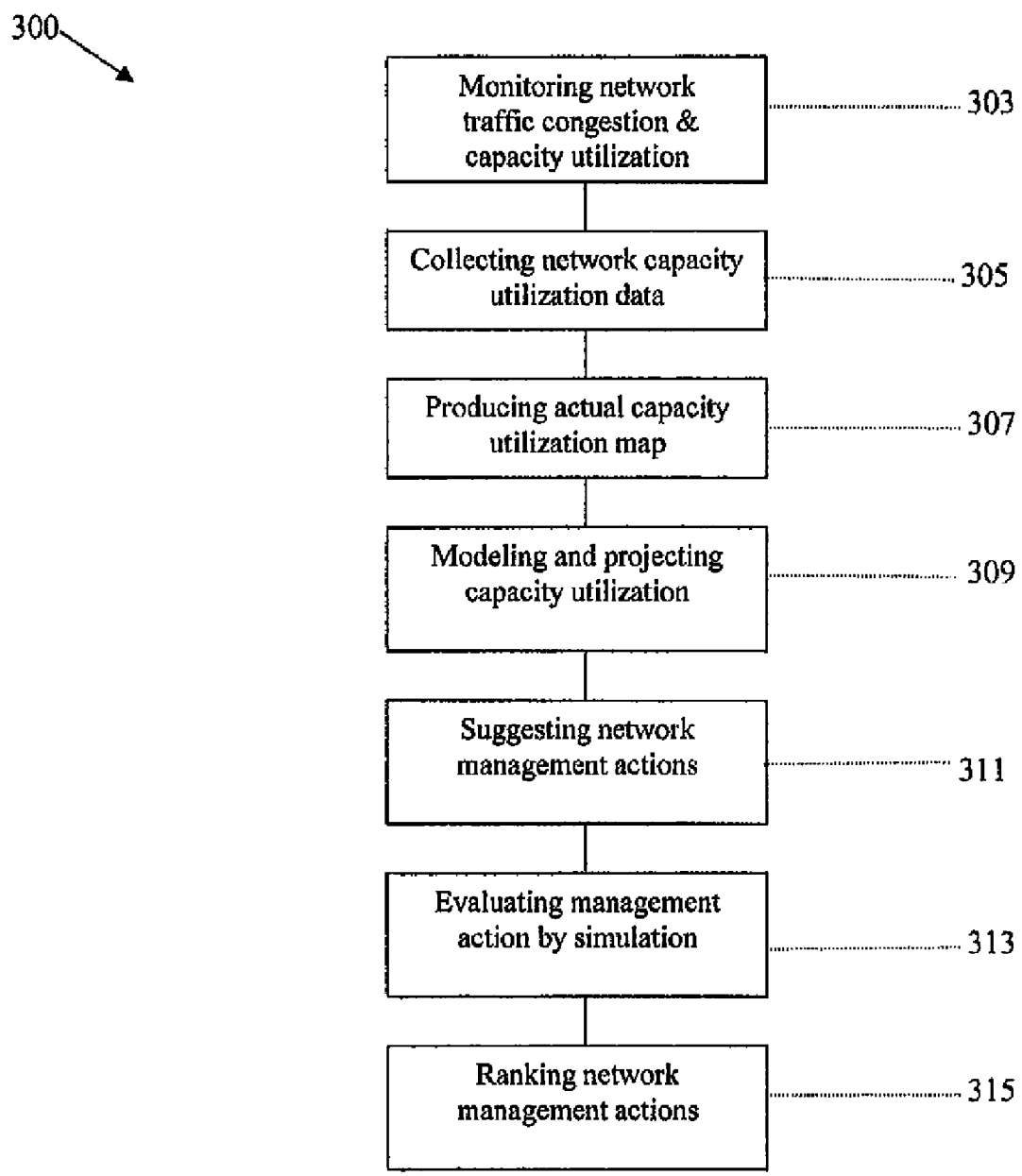
FIG. 3 illustrates an embodiment of a method for managing network-wide capacity.

FIG. 3 illustrates an embodiment of a method 300 for managing network-wide capacities. The method 300 may include monitoring network nodes 125 and network links 129 for capacity utilization data at block 303, collecting the capacity utilization data 125 at block 305, and producing one or more actual capacity utilization maps at block 307. The method also includes modeling and projecting capacity utilization by producing one or more projected capacity utilization maps at block 309, suggesting one or more network management actions at block 311, evaluating the network management actions at block 313, and ranking the network management actions at block 315.

The block 303 shows monitoring the network nodes 125 and the network links 129 for capacity utilization data. This may include watching for network events and initiating data collection when a capacity utilization related event is detected. The monitoring may be done in real time or non-real-time manner. Real time monitoring may be done on a periodic basis with negligible delay. Non-real-time monitoring may be done offline or at a scheduled time.

The block 305 shows collecting the plurality of capacity utilization data. The type of capacity utilization data depends on type of the capacity. This may include collecting the capacity utilization data for the network nodes 125 and the network links 129, and filtering, organizing, and storing the capacity utilization data. Collecting the capacity utilization data may involve polling or receiving the data from a capacity reporting module, such as a CRM 127 on a network node 125. Filtering the collected data may involve identifying and discarding the data noise such as a sudden, abnormal spike of data points. Organizing the collected data may involve collapsing multiple data points into an aggregate data point by averaging the data points over a specified period of time. For example, in order to obtain the capacity utilization for a switch in the fixed network 120, a ratio of the measured BHCA to the design capacity of BHCA may be obtained. A number of traffic load data points may be obtained first and then averaged over the specified period of time to get measured BHCA. Then ratio of the measured BHCA to the design capacity of BHCA may be calculated. Storing the data may involve storing the data into a database such as the network resource database 220. The data collection may take place at the same time as the network monitoring and may be done in either a real-time or a non-real-time fashion.

The block 307 shows producing one or more actual capacity utilization maps. This may include analyzing the collected capacity utilization data and generating one or more actual capacity utilization maps. Analyzing the collected utilization data may involve mapping a utilization data to a network node 125 or a network link 129, and detecting those nodes or links that have capacity utilizations going over a normal range. Generating an actual capacity utilization map involves connecting the network nodes 125 and network links 129 together to provide a network-wide view of the capacity utilization for a specified date. An additional actual capacity utilization map may be generated using a set of capacity utilization data of a different date. The actual capacity utilization map may be represented as a graph, a table or other forms, depending on the design choice. The actual capacity utilization maps may be displayed to an operator or manager, for example using the dashboard 211. The displaying may take the form of showing the actual capacity utilization maps on a display screen, by printing the capacity utilization maps, or by some other presentation mechanism.

The block 309 shows modeling and projecting network-wide capacity utilization. This may include using network node design capacities and network link design capacities, applying capacity engineering constraints, and generating and/or producing one or more projected capacity utilization maps. Using a node design capacity may involve mapping the design capacity to a network node 125 or a network link 129. Applying network capacity engineering constraints may involve applying one or more capacity engineering constraints to the network node 125 or the network link, if applicable to obtain an ideal or theoretically optimal capacity utilization for the network node 125 or the network link 129. Generating and/or producing a projected capacity utilization map may involve connecting together the network nodes 125 and network links 129 along with projected capacity utilization to produce a network-wide view of the projected capacity utilization. Generating a projected capacity utilization map may also involve using historical capacity utilization data to verify and revise the projected utilization map as described above. The historical capacity utilization data may be obtained from the network resource database 220 or from another source. The projected capacity utilization maps may be displayed to an operator or manager, for example using the dashboard 211. The displaying may take the form of showing the projected capacity utilization maps on a display screen, by printing the projected capacity utilization maps, or by some other presentation mechanism.

The block 311 shows suggesting one or more network management actions. Suggesting one or more network management actions may include comparing the actual capacity utilization map with a projected capacity utilization map and identifying the area for network management actions. Comparing the actual capacity utilization map with the projected capacity utilization map may reveal that some network nodes and network links are over utilized, and some other nodes and links are underutilized. Some links or nodes may be a bottleneck of the overall traffic flows. Identifying the area for network management actions may involve identifying the over utilized and underutilized network nodes and links and suggesting alternative network management actions. The alternative network management actions may include that the underutilized nodes or links may be moved to the area where the node or links are over utilized and some over utilized nodes or links may be replaced with nodes or links with larger capacities.

The block 313 shows evaluating a network management action by simulation. This may include simulating a network, taking a network management action on the simulated network, and generating a simulated capacity utilization map. Simulating a network may involve using a network simulator to build a network such as the wireless network 110 and the fixed network 120. The simulated network nodes and network links may have design capacities and actual capacity utilizations. Taking the network management action on the simulated network may involve carrying out the network management action on the simulated network to produce simulated capacity utilizations for the network nodes and network links in the simulated network. Generating a simulated capacity utilization map may involve collecting the simulated capacity utilization data and connecting together the simulated network nodes and network links, along with the simulated capacity utilization data, to produce a network-wide view of the simulated capacity utilizations. The simulated capacity utilization map may represent a network-wide view of capacity utilizations in the simulated network after the network management actions are taken.

The block 315 shows ranking the alternative network management actions. The suggested network management actions may be evaluated as described earlier, and then ranked in an order of preference to help a network operator make a decision. Ranking the network management actions may involve identifying a set of evaluation criteria that may be defined by the operator, obtaining one or more simulated capacity utilization maps by running the simulation module 207, and prioritizing the alternative network management actions according to the operator-defined criteria and the simulated capacity utilization maps. Identifying a set of evaluation criteria may include assigning weights to one or more network management actions to accommodate some special circumstances. For example, when cost of leased links are favorable to the network operator because of a special discount offer, the management action of adding leased links may have more weight than moving some underutilized links from one part of the network to another part of the network for a specified period of time. Other criteria may include maintaining a quality of service, satisfying reliability requirements, and others.

Figure 4:
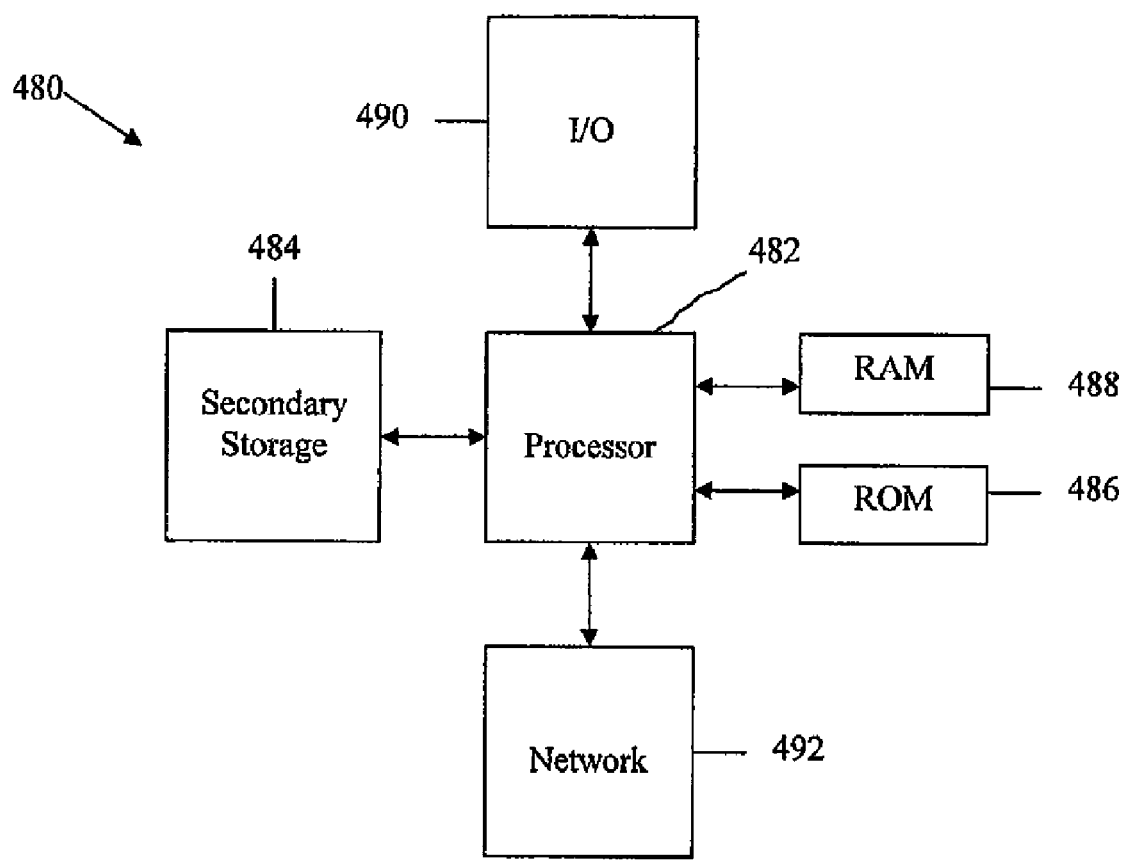
FIG. 4 illustrates an exemplary general-purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor may be implemented as one or more CPU chips.

The secondary storage 484 is typically comprised of one or more disk drives or tape drives and is used for non-volatile storage of data and as an over-flow data storage device if RAM 588 is not large enough to hold all working data. Secondary storage 584 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (MAN) cards, radio transceiver cards such as code division multiple access (CDMA) and/or global system for mobile communications (GSM) radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for managing network capacities, comprising:
   a processor implementing
      a data collection module configured to collect a plurality of capacity utilization data,
      a capacity analysis module configured to produce an actual capacity utilization map using the plurality of capacity utilization data, and to produce a projected capacity utilization map that represents a theoretically optimal state of capacity utilization for a plurality of nodes, links, or both using a plurality of designed node capacities, a plurality of designed link capacities, and a plurality of capacity engineering constraints,
      a simulation module configured to simulate a network management action, and to produce one or more simulated capacity utilization maps, and
      a network management action module configured to suggest one or more network management actions based on comparing the actual capacity utilization map and the projected capacity utilization map, and to rank the one or more network management actions based on the one or more simulated capacity utilization maps.

2. The system of claim 1, further comprising a network resource database configured to store a plurality of network node data and a plurality of network link data.

3. The system of claim 1, further comprising a network traffic monitoring module configured to monitor the plurality of network nodes and the plurality of network links for the plurality of capacity utilization data.

4. The system of claim 1, further comprising a dashboard to display the actual capacity utilization map, the projected capacity utilization map, and the one or more simulated capacity utilization map.

5. The system of claim 1, further comprising a user interface to allow for adding a new network node data and network link data, and deleting and modifying one or more existing network node data and network link data.

6. The system of claim 1, wherein the data collection module is configured to communicate with a plurality of capacity reporting modules (CRM) on the plurality of network nodes to collect the plurality of capacity utilization data.

7. The system of claim 1, wherein the plurality of capacity utilization data comprise a plurality of node capacity utilization data and a plurality of link capacity utilization data.

8. The system of claim 1, wherein the actual capacity utilization map is one of a graph and a table representation of the plurality of network nodes, the plurality of network links connecting the plurality of network nodes, and a plurality of node capacity utilization data, and a plurality of link capacity utilization data.

9. The system of claim 1, wherein the network management action module is configured to take a network management action in response to one or more network events that comprise a detection of one or more underutilized nodes, a detection of one or more underutilized links, a determination of one or more over utilized network nodes, a determination of one or more over utilized network links, a network link outage, and a network node outage.

10. The system of claim 1, wherein the network management actions comprises adding a new network component at a first location, decommissioning a first existing network component at a second location, and relocating a second existing network component from the first location to the second location, wherein the network component is one of a network node and a network link.

11. A method for managing network resources, comprising:
    collecting a plurality of capacity utilization data from a plurality of network nodes;
    producing and displaying one or more actual capacity utilization maps using the plurality of capacity utilization data;
    producing and displaying one or more projected capacity utilization maps that represents a theoretically optimal state of capacity utilization for a plurality of nodes, links, or both using one or more link design capacities, one or more node design capacities, and one or more network capacity engineering constraints;
    suggesting one or more network management actions based on comparing the one or more actual capacity utilization maps and one or more projected capacity utilization maps;
    simulating the one or more network management actions to produce one or more simulated capacity utilization maps; and
    ranking the one or more network management actions.

12. The method of claim 11, further comprising monitoring the plurality of network nodes and a plurality of network links for the plurality of capacity utilization data.

13. The method of claim 11, further comprising taking a network management action based on a rank of the one or more network management actions.

14. The method of claim 11, wherein collecting the plurality of capacity utilization data comprises storing the plurality of capacity utilization data in a network resource database.

15. The method of claim 11, wherein producing the one or more actual capacity utilization maps comprises averaging a plurality of utilization data points to obtain an average utilization for one of the plurality of network nodes or one of the plurality of network links.

16. The method of claim 11, wherein suggesting one or more network management actions comprises taking into consideration a plurality of past capacity utilization data.

17. The method of claim 11, wherein simulating the one or more network management actions comprises taking the one or more network management actions in a simulated network and collecting a plurality of simulated capacity utilization data.

18. The method of claim 11, wherein ranking the one or more network management actions comprises taking into consideration one or more weights associated with the one or more network management actions.

19. A system, comprising:
    a plurality of network nodes configured with one or more capacity reporting modules (CRMs); and
    a network capacity management system configured
        to receive a plurality of capacity utilization data from the one or more CRMs,
        to produce one or more actual capacity utilization maps using the plurality of capacity utilization data,
        to produce one or more projected capacity utilization maps that represents a theoretically optimal state of capacity utilization for a plurality of nodes, links, or both using one or more design network capacities and one or more capacity engineering constraints,
        to suggest one or more network management actions based on comparing the one or more actual capacity utilization maps and the one or more projected capacity utilization maps,
        to evaluate a network management action by simulating the network management action and by producing one or more simulated capacity utilization maps, and
        to take one or more network management actions based on the simulated capacity utilization maps.

20. The system of claim 19, wherein the network capacity management further comprises a dashboard to display the actual network capacity utilization maps, the projected network capacity utilization maps, and the simulated capacity utilization maps.

* * * * *